United States Patent [19]
Titus

[11] 3,802,187
[45] Apr. 9, 1974

[54] EXHAUST SYSTEM FOR REAR DRIVE ENGINE

[75] Inventor: Donald E. Titus, Shelton, Conn.

[73] Assignee: Avco Corporation, Stratford, Conn.

[22] Filed: June 1, 1972

[21] Appl. No.: 258,501

[52] U.S. Cl............ 60/39.5, 60/271, 415/209, 239/265.19
[51] Int. Cl............ F02c 7/00, F01d 1/02
[58] Field of Search......... 60/39.5, 39.75, 264, 271; 181/33 HB; 239/265.19; 415/219, 210, 209, 79

[56] References Cited
UNITED STATES PATENTS

| | | | |
|---|---|---|---|
| 3,400,911 | 9/1968 | Kojima | 60/39.5 |
| 3,552,877 | 1/1971 | Christ et al. | 415/20 |
| 2,410,810 | 11/1946 | Cronstedt | 415/219 |
| 2,724,545 | 11/1955 | Oechslin | 415/209 |
| 2,914,919 | 12/1959 | Varedi | 415/209 |

FOREIGN PATENTS OR APPLICATIONS

| | | | |
|---|---|---|---|
| 746,832 | 3/1956 | Great Britain | 60/39.5 |

Primary Examiner—Carlton R. Croyle
Assistant Examiner—Warren Olsen
Attorney, Agent, or Firm—Charles M. Hogan; Gary M. Gron

[57] ABSTRACT

A high efficiency exhaust system for a rear drive turboshaft gas turbine engine comprises a short length, high diffusion ratio annular diffuser with a splitter to minimize separation of flow from the walls of the diffuser. The diffuser connects with an elbow duct having an annular inlet, an intermediate portion permitting the engine output shaft to extend outside of the flow path through the diffuser and an elliptical exhaust directed to an angle with respect to the axis of the output shaft.

7 Claims, 4 Drawing Figures

PATENTED APR 9 1974  3,802,187

EXHAUST SYSTEM FOR REAR DRIVE ENGINE

The present invention relates to exhaust systems for gas turbine engines and more particularly to exhaust systems for rear drive engines of this type.

Frequently there are turboshaft gas turbine engine applications that call for a rotary output drive from the aft end of the engine. That is to say, the power output shaft extends downstream from the last power turbine blade stage. In installations of this type it is necessary to direct the relatively hot exhaust gases from the power turbine that is surrounded by the hot gas stream around the output shaft to a point angled with respect to the exhaust flow from the power turbine. In the past this has been done with a simple semi-bifurcated outlet duct passing the gases around the output shaft into a suitable side directed exhaust. This type of exhaust system, however, has the disadvantage of generating a substantial amount of flow losses caused by the turning of the high velocity gas being discharged from the turbine. These losses plus the fact that it is difficult to properly diffuse the air in systems of this type, greatly reduces the efficiency of the power turbine.

Accordingly, it is an object of the present invention to provide a compact exhaust system for a rear drive gas turbine engine which efficiently and effectively passes the gas around the output shaft and to a suitable side directed outlet.

These ends are achieved by a rear drive gas turbine engine exhaust system comprising a relatively short diffuser having a substantial area increase ratio for recovering a substantial portion of velocity head in the gas stream discharged from the engine, as static pressure. An elbow duct receives the flow from the diffuser and turns it to a discharge in which the flow is angled with respect to the flow emanating from the turbine.

The above and other related objects and features of the present invention will be apparent from a reading of the following description of the disclosure shown in the accompanying drawings and the novelty thereof pointed out in the appended claims.

Figures 1, 2, 3, 4:
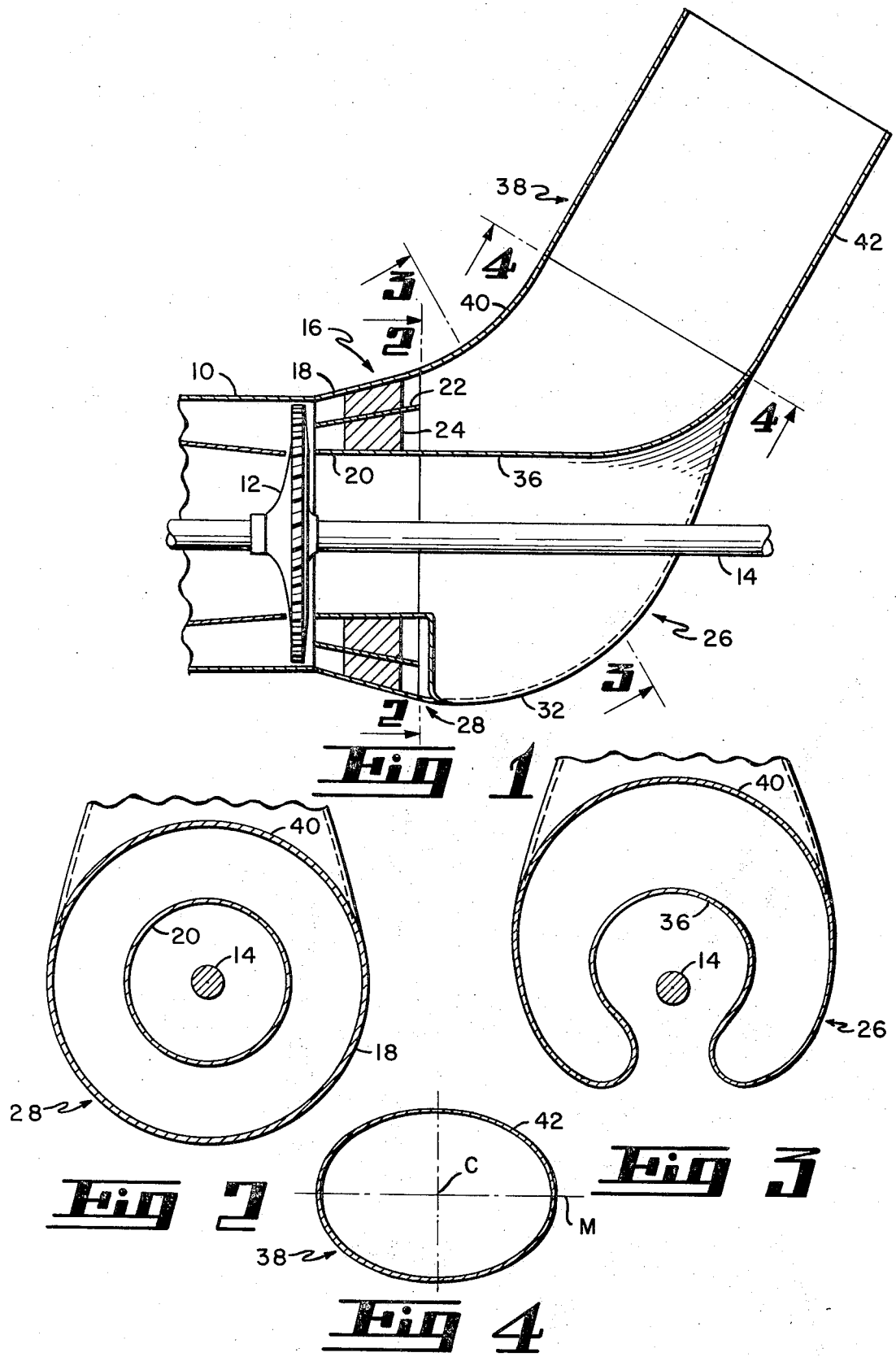
FIG. 1 is a longitudinal sectional view of an exhaust system embodying the present invention, along with pertinent portions of a rear drive gas turbine engine with which it may be used.
FIG. 2 is a view taken on lines 2—2 of FIG. 1.
FIG. 3 is a view taken on lines 3—3 of FIG. 1.
FIG. 4 is a view taken on line 4—4 of FIG. 1.

Referring now to FIG. 1, there is shown the aft casing 10 of a gas turbine engine. Suitably journaled within this casing is a bladed power turbine rotor 12. This rotor connects with a power output shaft 14 extending in a rear direction from the engine casing 10. The bladed turbine rotor 12 rotates in response to the passage of a hot gas stream which then passes to an annular diffuser, generally indicated by reference character 16.

Diffuser 16 comprises an outer annular duct 18 and inner annular duct 20, both generally conical in form. As is apparent in the drawing, these ducts have a substantial degree of divergence between them. An annular splitter 22, generally conical in form, is positioned in between ducts 18 and 20 by a series of suitable radial struts 24 so that a pair of coaxial annular diffuser passages are formed. The splitter enables the divergence ratio of the individual passages so formed to be sufficiently low to prevent separation of flow from the walls. However, the over-all divergence ratio of the diffuser is the sum of the two, thereby enabling a high degree of diffusion for a relatively short axial length. From there the flow passes to a downstream elbow duct, generally indicated by reference character 26.

Elbow duct 26 has a generally constant cross-sectional flow area and comprises an annular inlet portion 28 extending from annular diffuser 16, as shown in FIG. 2. The elbow duct 26 has an intermediate turning portion 32 having a generally arcuate cross-sectional shape, as shown in FIG. 3, to permit the output shaft 14 to extend rearward outside of the hot gas flow path through the elbow duct 26.

The elbow duct is contoured to transform smoothly to an elliptically shaped outlet 38. The major axis of the ellipse M is generally at a right angle with respect to a plane formed by the longitudinal axis of an output shaft 14 and the center C of the ellipse forming the outlet 38, as shown particularly in FIG. 4. This enables the inner curl 40 of the elbow duct 26 to be substantially greater than that for a circular exhaust. From there the exhaust gases pass through a suitable duct 42 to the atmosphere.

In operation the high velocity exhaust gas stream from the engine 10 is substantially diffused and its velocity decreased in the diffuser 16 to recover a substantial portion of the velocity head available in the gas stream as static pressure. This high diffusion rate (as high as 72 percent of the velocity head recovered as static pressure) is permitted in the relatively short axial length by the use of the conical splitter 22. The reason for this is that the splitter divides the diffuser into two coaxial annular diffusers, each contributing to the total diffusion ratio. This reduces the divergence in the individual channels to a point where flow separation from the walls is minimized, if not eliminated. Once the gases are sufficiently diffused they are turned through the intermediate portion 32 to the elliptical outlet 38. The use of the elliptically shaped outlet 38 enables a more gradual curve for the inner curl 40 of the intermediate portion for a given exhaust area and a given axial length. This greatly reduces the turning losses and makes for a high efficiency flow. The net effect of this exhaust system is to recover within a given axial length as much of the static pressure head available in the hot gas stream discharged from the turbine before it is turned around the power shaft to the side directed exhaust. As a result, the back pressure on the turbine is minimized which enables it to produce a maximum of power. Furthermore, the elliptically shaped outlet 38 enables a more gradual curvature for a given axial length to minimize turning losses while maintaining sufficient flow area.

While the preferred embodiment of the present invention has been disclosed, it should be apparent to those skilled in the art that it may be employed in other configurations without departing from the spirit and scope of the present invention.

Having thus described the invention, what is claimed as novel and desired to be secured by Letters Patent of the United States is:

1. A high efficiency exhaust system for a turboshaft engine having an annular discharge and a rear drive output shaft, said exhaust system comprising:
   an annular relatively short diffuser having a substantial area increase ratio for recovering, as static pressure, a substantial portion of the velocity head in the gas stream discharged from said engine;

an elbow duct receiving the flow from said diffuser and turning it to a discharge in which the flow therefrom is angled with respect to the flow passing from said turbine, said elbow duct having an intermediate portion permitting said output shaft to extend rearward outside of the hot gas flow path through said elbow duct, said elbow duct having an elliptically shaped outlet with the major axis of the ellipse positioned generally at right angles to a plane formed by the longitudinal axis of said output shaft and the center of the ellipse forming said outlet thereby permitting a more gradual curvature to said elbow.

2. An exhaust system as in claim 1 wherein said diffuser comprises inner and outer generally conical walls having substantial divergence angles and an intermediate generally conical splitter dividing the flow into inner and outer coaxial annular diffusers, thereby minimizing separation of flow from the diffuser walls.

3. An exhaust system as in claim 1 wherein said elbow duct is contoured to produce a generally constant cross-sectional flow area comprising an annular inlet section, an arcuate intermediate section and a curvilinear outlet section.

4. A gas turbine engine comprising:
a gas generator for generating a hot gas high velocity stream;
an axial flow power turbine positioned aft of said gas generator so that the hot gas stream passes across said power turbine;
a power turbine shaft extending aft from said axial flow power turbine;
an annular relatively short diffuser positioned aft of said power turbine and surrounding said power turbine shaft, said diffuser having a substantial area increase ratio for recovering, as static pressure, a substantial portion of the velocity head in the gas stream discharged from said power turbine; and
an elbow duct having an annular inlet receiving flow from said diffuser and an intermediate portion permitting said output draft to extend rearward outside of the hot gas flow path through said elbow duct and an outlet portion discharging said gas stream to atmosphere in a direction angled with respect to the flow from said power turbine, the outlet of said elbow duct having an elliptical shape with the major axis of the ellipse positioned at a right angle to a plane formed by the longitudinal axis of said output shaft and the center of the ellipse forming said outlet thereby permitting a more gradual curvature to said elbow duct.

5. A gas turbine engine as in claim 4 wherein said diffuser recovers approximately 75 percent of the static pressure of the gas stream discharged from said power turbine.

6. A gas turbine engine as in claim 4 wherein said diffuser comprises inner and outer generally conical walls having substantial divergence angles and an intermediate generally conical splitter dividing the flow into inner and outer coaxial annular diffusers thereby minimizing separation of flow from the diffuser walls.

7. A gas turbine engine as in claim 4 wherein said elbow duct is contoured to produce a generally constant cross-sectional flow area comprising an annular inlet section, an arcuate intermediate section and said elliptical outlet section.

* * * * *